United States Patent
Cook et al.

(10) Patent No.: US 9,563,980 B2
(45) Date of Patent: Feb. 7, 2017

(54) GRIP MANIPULATABLE SHADOWS IN 3D MODELS

(75) Inventors: JoAnna Cook, Oakland, CA (US); Jose Madeira de Freitas Garcia, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 2172 days.

(21) Appl. No.: 11/283,324

(22) Filed: Nov. 18, 2005

(65) Prior Publication Data

US 2007/0115275 A1     May 24, 2007

(51) Int. Cl.
*G06T 1/00*        (2006.01)
*G06T 19/00*     (2011.01)
*G06T 15/60*     (2006.01)

(52) U.S. Cl.
CPC .............. *G06T 19/00* (2013.01); *G06T 15/60* (2013.01)

(58) Field of Classification Search
CPC ..................................................... G06T 15/60
USPC .............. 345/418, 426, 427, 429; 434/307 R
See application file for complete search history.

(56) References Cited

U.S. PATENT DOCUMENTS

| | | | | |
|---|---|---|---|---|
| 4,943,938 A | * | 7/1990 | Aoshima et al. | 345/422 |
| 5,083,287 A | * | 1/1992 | Obata et al. | 345/426 |
| 5,299,298 A | * | 3/1994 | Elmquist et al. | 345/421 |
| 5,357,599 A | * | 10/1994 | Luken | 345/627 |
| 5,568,595 A | * | 10/1996 | Yosefi et al. | 345/426 |
| 5,572,635 A | * | 11/1996 | Takizawa et al. | 345/426 |
| 5,613,050 A | * | 3/1997 | Hochmuth et al. | 345/422 |
| 5,659,671 A | * | 8/1997 | Tannenbaum et al. | 345/426 |
| 5,739,819 A | * | 4/1998 | Bar-Nahum | 345/426 |
| 5,739,820 A | * | 4/1998 | Lyon | 345/426 |
| 5,742,292 A | * | 4/1998 | Murata | 345/426 |
| 5,742,749 A | * | 4/1998 | Foran et al. | 345/426 |
| 5,805,782 A | * | 9/1998 | Foran | 345/426 |
| 5,844,566 A | * | 12/1998 | Lecland et al. | 345/426 |
| 5,870,097 A | * | 2/1999 | Snyder et al. | 345/426 |

(Continued)

FOREIGN PATENT DOCUMENTS

| | | |
|---|---|---|
| JP | 02024785 | 1/1990 |
| JP | 07129976 | 5/1995 |

(Continued)

OTHER PUBLICATIONS

Pellacini et al "User Interface for Interactive Cinematic Shadow Design," ACM Transactions on Graphics, ACM, US, vol. 21, No. 3, Jul. 1, 2002, pp. 563-566.

(Continued)

*Primary Examiner* — Sam Yao
*Assistant Examiner* — Alvin Carlos
(74) *Attorney, Agent, or Firm* — Artegis Law Group, LLP (57) ABSTRACT

Embodiments of the invention provide a method for manipulating the position and appearance of shadows cast by light striking objects within a three dimensional model. Typically, the location and appearance of shadows are determined using the position of a distant light source. A user selects a point from within a shadow bounded region to drag from an initial position to a destination position. Once a point is selected, the position of the light source may be adjusted about a pivot point. The adjusted position of the light source is determined based on the position of the destination position and the position of the pivot point within the 3D model.

24 Claims, 9 Drawing Sheets

(56) References Cited

U.S. PATENT DOCUMENTS

| | | | |
|---|---|---|---|
| 5,896,135 A * | 4/1999 | Yang | 345/427 |
| 5,936,629 A * | 8/1999 | Brown et al. | 345/426 |
| 5,974,189 A * | 10/1999 | Nicponski | 382/254 |
| 5,986,670 A * | 11/1999 | Dries et al. | 345/629 |
| 6,014,472 A * | 1/2000 | Minami et al. | 382/285 |
| 6,016,149 A * | 1/2000 | Morse | 345/426 |
| 6,081,274 A * | 6/2000 | Shiraishi | 345/426 |
| 6,124,808 A * | 9/2000 | Budnovitch | 340/932.2 |
| 6,175,367 B1 * | 1/2001 | Parikh et al. | 345/426 |
| 6,195,099 B1 * | 2/2001 | Gardiner | 345/426 |
| 6,362,822 B1 * | 3/2002 | Randel | 345/426 |
| 6,462,768 B1 * | 10/2002 | Oakley | 348/31 |
| 6,549,203 B2 * | 4/2003 | Randel | 345/426 |
| 6,654,013 B1 * | 11/2003 | Malzbender et al. | 345/426 |
| 6,664,962 B1 * | 12/2003 | Komsthoeft et al. | 345/426 |
| 6,667,741 B1 * | 12/2003 | Kataoka et al. | 345/426 |
| 6,798,408 B2 * | 9/2004 | Tokuyama et al. | 345/426 |
| 6,900,804 B1 * | 5/2005 | Iwade et al. | 345/426 |
| 6,903,741 B2 * | 6/2005 | Corbetta | 345/426 |
| 6,971,957 B2 * | 12/2005 | Osako | 463/31 |
| 7,050,054 B2 * | 5/2006 | Halmshaw | 345/424 |
| 7,064,755 B2 * | 6/2006 | Mech et al. | 345/426 |
| 7,193,630 B2 * | 3/2007 | Higuchi et al. | 345/586 |
| 7,427,986 B2 * | 9/2008 | Pellacini et al. | 345/426 |
| 2004/0081342 A1 * | 4/2004 | Sato | 382/128 |
| 2006/0026875 A1 * | 2/2006 | Elffers | 40/560 |
| 2006/0209067 A1 * | 9/2006 | Pellacini et al. | 345/426 |

FOREIGN PATENT DOCUMENTS

| | | |
|---|---|---|
| JP | 2000123198 | 4/2000 |
| JP | 2003216976 | 7/2003 |

OTHER PUBLICATIONS

Poulin et al., "Sketching Shadows and Highlights to Position Lights," Computer Graphics International, Proceedings Hassett and Diepenbeek, Belgium, Jun. 23-27, 1997, Los Alamitos, CA, IEEE Computer Society, Jun. 23, 1997, pp. 56-63.

Ronen, Barzel, "Lighting Controls for Computer Cinematography," Journal of Graphics Tools, Association for Computing Machinery, New York, US, vol. 2, No. 1, Jan. 1, 1997, pp. 1-20.

EP Search Report, EP 06802621.0, dated Sep. 21, 2009.

Pellacini, F., "A user interface for interactive cinematic shadow design," ACM Transactions on Graphics, vol. 21, issue 3, Jul. 2002, p. 563-566.

Japanese Office Action for S/N JP 2008-541157, dated Nov. 16, 2010.

* cited by examiner

FIG. 9 ns of hours of the day). For these reasons, some CAD applications include features that allow users to perform a "sun study" that will determine how shadows cast by a proposed structure may impact on neighboring properties. The appearance and position of shadows may be determined from the position of the sun, and the geographic location of the structure, as specified by the 3D model. One drawback to this approach, however, is that a user may inadvertently specify a position of a light source that is not physically possible.

GRIP MANIPULATABLE SHADOWS IN 3D MODELS

BACKGROUND OF THE INVENTION

Field of the Invention

The present invention generally relates to computer software. More specifically, the present invention relates to a computer aided design application that allows users to modify a shadow cast by a light source in a 3-dimensional model (3D model).

Description of the Related Art

Currently, computer aided design (CAD) applications are available that allow a designer or engineer to generate computer models of real-world 3D objects. Such models are often used to generate a visual rendering of the real-world 3D object. A 3D model may vary from a model of a single, small object (e.g., a model of a teapot) to a model of a complicated architectural plan that includes buildings, landscaping, roads, etc.

One common feature provided by many CAD applications is to allow users to specify light sources within a 3D model. Based on the position of a light source and the shape of an object within the 3D model, the CAD application may be configured to generate a realistic appearance of shadows in the 3D model. For example, a 3D model of a building may include a distant light source representing light from the sun. The sunlight may be used to generate shadows that accentuate elements of a building's design, and not necessarily to model how the shadows cast from the building appear at a particular date and time. That is, shadows may be used to present a visual display of objects within the 3D model in an aesthetically pleasing manner, rather than for analytical accuracy.

Typically, however, the distant light source is not an object within a 3D model. That is, the light source is not an object appearing in the space defined for the 3D model that may be directly manipulated. Rather, a distant light source is oftentimes specified using a vector that represents the direction at which light rays from the distant light source strike objects present in the 3D model. Consequently, the appearance and position of shadows cast by these objects is determined from this vector. Thus, to alter the appearance and position of a shadow, data specified for the vector must be modified, and then the impact on a particular shadow can be ascertained.

One drawback to this approach is that the impact of a given modification is apparent only after the position of the distant light source is changed. Thus, a user may be forced to repeat this process many times before achieving a desired effect. Alternatively, users may manually modify an image generated from the 3D model (e.g., a .jpg or .png file) using an additional software tool. This allows users to essentially "paint" shadows that have a desired appearance. However, if the user changes the position or appearance of objects within the 3D model, the shadows must again be "painted" onto the image.

Additionally, the analytical accuracy of a shadows cast by an object within the 3D model may sometimes be relevant. For example, consider an architect composing a 3D model of a proposed structure bordering a greenhouse. The architect may wish to determine whether the location and shape of the proposed structure would cast an unacceptable shadow over the greenhouse. Similarly, some municipalities have enacted land-use regulations limiting what shadows a structure may cast over certain locations (e.g., specifying that a public fountain must be in the sun for a certain number Accordingly, there is a need in the art for a more efficient technique to manipulate shadows in a 3D model and to indicate whether a derived shadow configuration is feasible, given the parameters of the 3D model.

SUMMARY OF THE INVENTION

Embodiments of the invention provide, among other things, a method, a computer-readable medium, and an apparatus for manipulating the appearance and position of a shadow cast by an object included in a 3D model. In one embodiment, a user first enables a shadow editing mode. Once enabled, a user may modify the appearance and position of a shadow by grabbing a shadow at a selected grip-point, dragging the shadow to a desired location, and releasing the shadow grip-point.

One embodiment of the invention provides a method for manipulating the appearance of a shadow cast by a light source striking a three-dimensional (3D) object in a 3D model. The method generally includes receiving an indication of a shadow grip-point, selected from within a shadow-bounded region. The shadow grip-point corresponds to a first geometric position within the 3D model. The method generally further includes, determining a pivot point, and, in response to the dragging of the shadow grip-point, adjusting the position of the distant light source to correspond to the position of the shadow grip-point and the pivot point. While the shadow grip-point is being dragged, the appearance of the shadow bounded region may be rendered on a visual display. When the desired appearance of the shadow is achieved, the location of the distant light source may be updated based on a destination point selected for the shadow grip-point, wherein the destination corresponds to a second geometric position within the 3D model.

Because a distant light source may strike many objects in a 3D model, the appearance of a shadow-bounded region for each such object may be rendered after the destination point is selected. In a particular embodiment, the distant light source provides a 3D model representing light from the sun striking the 3D objects within the 3D model. Because some shadow positions would require the sun be in a position that will never physically occur, a user composing the 3D model may be presented with an indication whether the sun position required for a particular shadow appearance is physically possible.

In general, the current position of the shadow grip-point and the pivot point are used to calculate the position of the distant light source. Also, the distant light source may be represented using a vector specifying the direction at which light rays emanating from the distant light source will strike the 3D object. Additionally, a user may interact with the 3D model by moving a mouse cursor, in one embodiment, such movements of a mouse cursor are translated to move the shadow grip-point in a two dimensional workplane.

BRIEF DESCRIPTION OF THE DRAWINGS

So that the manner in which embodiments of the present invention may be understood in detail, a more detailed description of the invention, briefly summarized above, may be had by reference to the appended drawings. These drawings, however, illustrate typical embodiments of the invention and are not meant to be limiting of its scope, for the invention may admit to other equally effective embodiments.

DETAILED DESCRIPTION OF THE PREFERRED EMBODIMENTS

Figure 1:
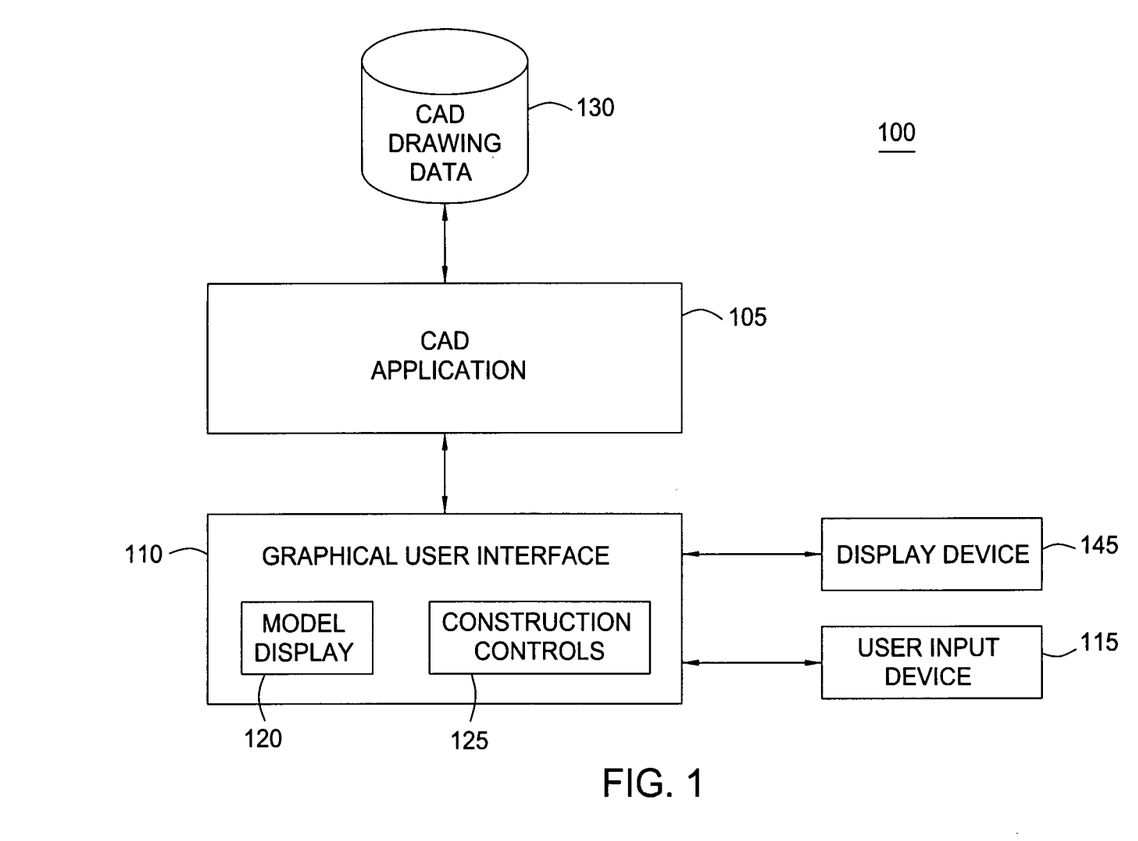
FIG. 1 is a block diagram illustrating components of a CAD application, according to one embodiment of the invention.

FIG. 1 is a block diagram illustrating an exemplary CAD environment 100 for manipulating a shadow cast by a light source in a 3D model. In one embodiment, the components provided by environment 100 include computer software applications executing on existing computer systems, e.g., desktop computers, server computers, laptop computers, tablet computers, and the like. The functionality of the CAD applications described herein, however, is not limited to any currently existing computing environment, and may be adapted to take advantage of new computing systems as they become available.

Additionally, the software components illustrated in FIG. 1 may be executing on distributed systems communicating over computer networks including local area networks or disparate wide area networks, such as the Internet. For example, the graphical user interface 110 may include a software program executing on a client computer system communicating with the CAD application 105 and the database 130 resident on a networked server computer. Also distributed networks may operate using a client and server topology, or operate in a peer-to-peer fashion.

As shown, the CAD environment 100 includes, without limitation, a CAD application program 105, a graphical user interface 110 that includes a 3D model display 120 and a 3D model construction interface 125, a user input device 115, a display device 145, and 3D model geometry data 130. In one embodiment, the CAD application 105 is a computer program configured to generate a 3D model. Preferably, the AutoCAD® application program and associated utilities available from AutoDesk, Inc. may be used. The 3D model generated by CAD application 105 includes the alignment, characteristics, appearance, and geometry of the real-world structure represented by the 3D model.

The graphical user interface 110 may provide GUI elements that allow a user to compose a 3D model. Accordingly, user actions such as drawing or adding three 3D objects, adding light sources, and the grip-point manipulation of shadows may all be performed using model construction tools 125. As a user interacts with the model via graphical user interface 110, 3D model display 120 provides a visual representation of the model on display device 145. The geometric data used to generate the visual representation may be stored in database 130. Further, data stored in database 130 may be used as the input for additional engineering calculations related to the 3D model. Input devices 115 allow a user to interact with the 3D model construction interface 125. Typically, user input devices 115 include a mouse pointing device and a keyboard. However, embodiments of the invention may be adapted to additional interface tools as they are made available.

Figure 2:
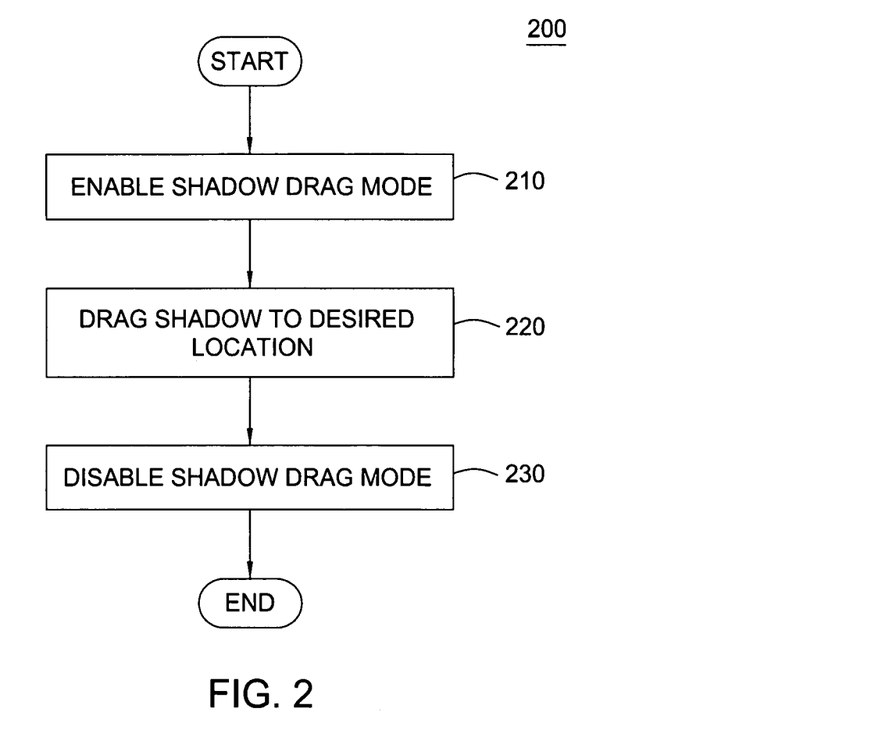
FIG. 2 illustrates a 3D model that displays shadows located in an initial position, according to one embodiment of the invention.

FIG. 2 is a flow chart illustrating a method 200 for modifying the appearance and position of shadows in a 3D model, according to one embodiment of the invention. The method 200 may be performed by a user interacting with CAD application 105. At step 210, the user enables shadow drag mode. For example, model construction tools 125 may include a toggle button used to enable shadow drag mode. Once enabled, user interaction within display area 120 may be interpreted as commands to select and drag a shadow to a desired position. Once a shadow grip-point is selected, at step 220, the user drags the shadow to a desired location. The more specific operations performed at step 220 are further described below in reference to in FIG. 9. After manipulating the shadow to have a desired position and appearance, shadow drag mode may be disabled at step 230.

Figure 3:
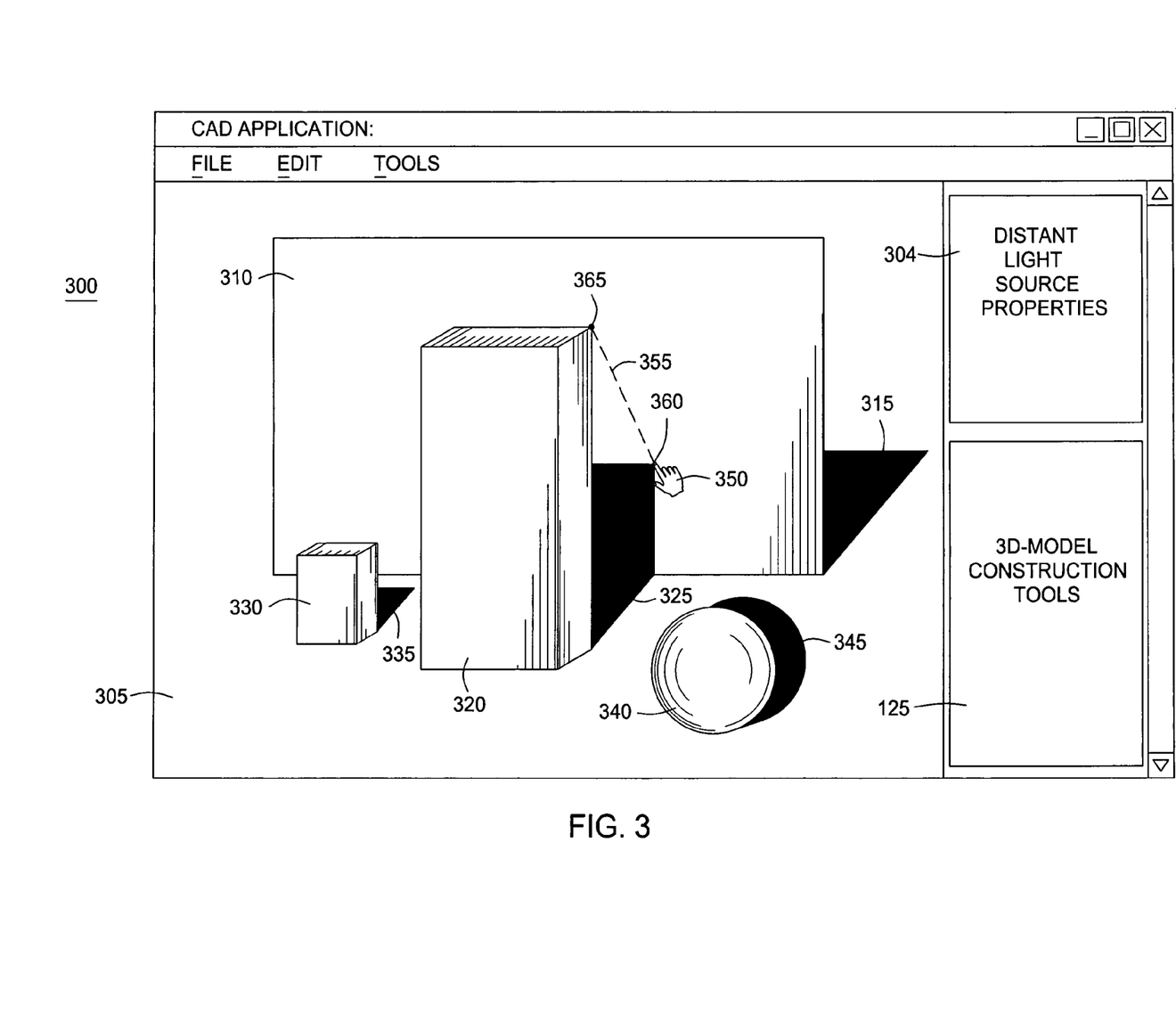
FIG. 3 illustrates a 3D model that displays shadows located at a destination position, according to one embodiment of the invention.
Figure 4:
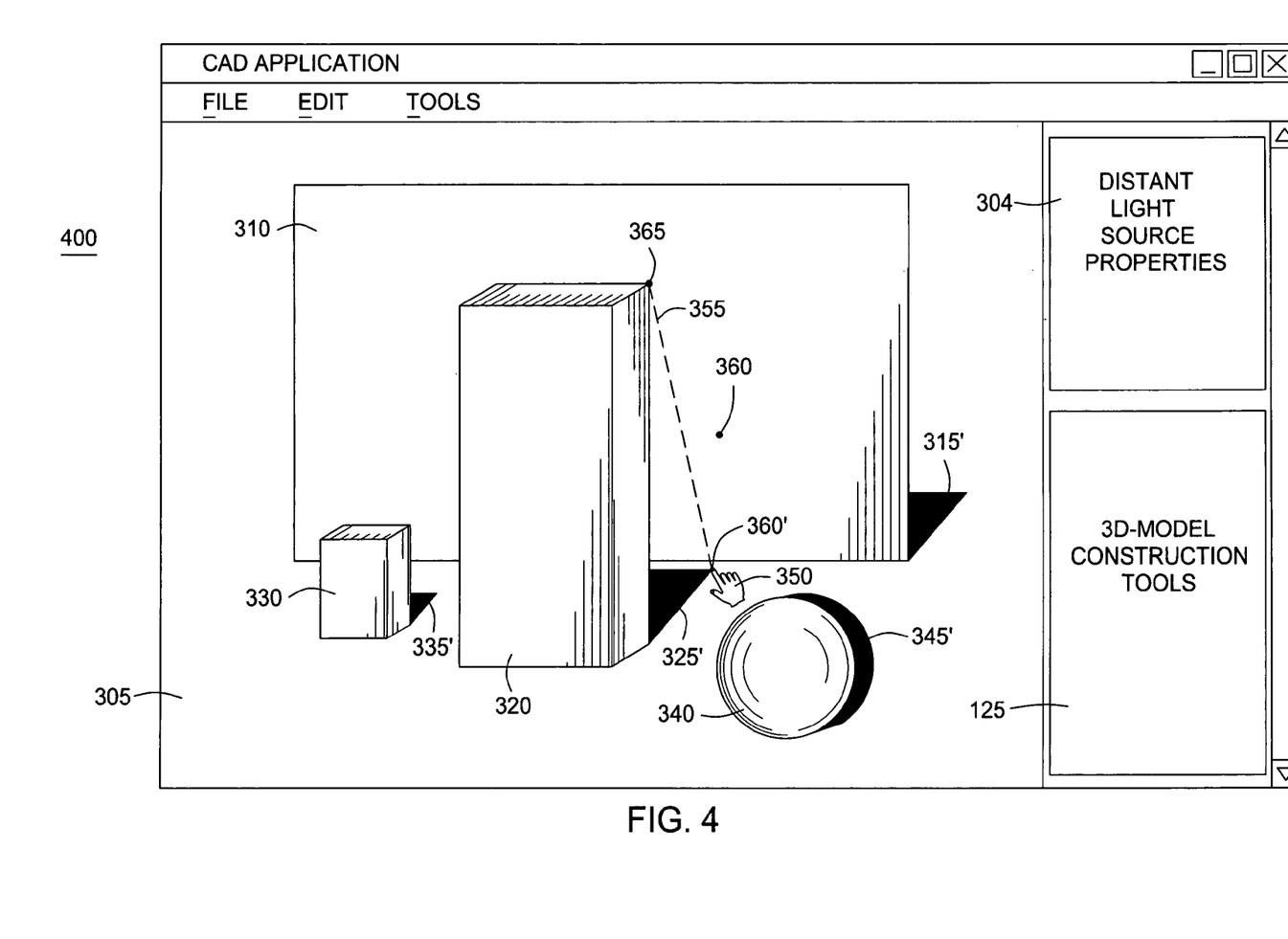
FIG. 4 is a flow chart illustrating a method for modifying the appearance and position of shadows in a 3D model, according to one embodiment of the invention.

FIGS. 3 and 4 illustrate "before" and "after" representations of a 3D model 305, wherein a user has moved the positions of shadows cast by a distant light source, according to the steps described for method 200. First, FIG. 3 illustrates a view 300 of a 3D model that includes shadows located in their initial positions. Illustratively, view 300 is shown as a rendering generated by CAD application 105. The 3D model displayed in view 300 includes a model display area 305, light source properties 304, and 3D model construction tools 125. A mouse cursor 350 is illustrated next to a grip-point 360 that also borders shadow 325 cast by object 320. As shown, the shadow 325 crosses a ground surface and runs along wall 310. Additionally, object 330, object 340, and wall 310, cast shadows 335, 345, and 315, respectively. When a user desires to move the shadows cast by the distant light source, the user first enables shadow drag mode (step 210 of method 200) and selects a point on the shadow grip-point to "grab," for example, by clicking a mouse button. The grabbed location sets an initial point (e.g., grip-point 360). In response, the CAD application 105 may be configured to calculate and display an indication of vector 355 and pivot point 365.

All of the light rays emanating from the distant light source strike objects in the 3D model in parallel to one another. In one embodiment, a pivot point 365 is determined by traversing from the shadow grip-point 360 in the direction of the distant light source until intersecting a solid body object (e.g. object 320) present in the 3D model. Alternatively, because the initial point and the distant light source form a line, any point on the line may be used as a pivot point 365. Thus, if the CAD application 105 cannot identify a single intersecting solid object, a default distance from the shadow grip-point 360 may be used to define pivot point 365.

However determined, once the shadow grip-point 360 and the pivot point 365 are determined, movements of the mouse cursor 350 may be translated as movements of the shadow grip-point within the 3D model. In one embodiment, the mouse movements are translated to drag the shadow grip-point within a two dimensional workplane within the 3D model. For example, a workplane may represent the face of a solid surface in the 3D model. When a user clicks a mouse button to grab a shadow (i.e., selects a shadow grip-point 360), movement of the mouse cursor may be translated as movement within the model using a two-dimensional workplane. For example, the face of a building may represent a workplane perpendicular to the ground. Movements of the mouse within this workplane are translated to up-and-down and left-to-right movements. The roof and ground of the building represent different workplanes. Movements in these latter workplanes are also translated as left-to-right, but instead of up-and-down, are translated as movements in-and-out of the workplane (i.e., movement representing depth).

In one embodiment, the movement of a shadow grip-point may be restricted to movements within a given workplane. Alternatively, a workplane may switch as the user drags the shadow grip-point from one surface to another, within the 3D model. Such a switch changes the two dimensional plane in which the shadow grip-point may be moved. For example, if a user drags a shadow grip-point from a shadow cast on the front of a building (i.e., in workplane perpendicular to the ground), to a location within the 3D model representing solid ground, then the workplane used to translate mouse movements may be switched to a ground surface workplane. Depending on the user, one alternative may be more intuitive than the other. Accordingly, in some cases, whether a workplane may change as the user drags the shadow grip-point may be set as a matter of user preference.

Returning to FIGS. 3 and 4, the initial shadow grip-point 360 is illustrated on wall 310; therefore, the workplane used to move this shadow grip-point 360 may be the vertical plane perpendicular to the ground that includes wall 310. Pivot point 365 is used to pivot the position of the distant light source as the shadow grip-point 360 is dragged by the user moving the mouse cursor 350. More specifically, as the user moves the shadow grip-point 360, the pivot point 365 remains stationary, and the positions of both the shadow grip-point 360 and the pivot point 365 are used to calculate the corresponding position of the distant light source. The CAD application 105 may be configured to calculate a vector representing the position of the distant light source based on the positions of the pivot point 365 and the position of the shadow grip-point 360. The data values for such a vector may be displayed in distant light properties box 304.

FIG. 4 illustrates the changes to the visual display of 3D model 305 that result from dragging the shadow grip-point 360 from an initial position to a destination position 360'. Illustratively, the shadow grip-point is shown located at destination position 360'. At the same time, the position and appearance of the bounded region defining shadow 325 has changed. Specifically, shadow 325' represents a shadow cast from a distant light source located at the vector extrapolated from the destination point 360' and pivot point 365. Additionally, the shadows 335', 345' and 315' have also moved in conformance with the new position for the distant light source. In an alternative embodiment, a distant light source may cast shadows for certain selected objects in a model. This would allow a user to change the appearance of shadows for a single object (e.g., object 320), without distributing other shadows in the 3D model 305. Once updated, distant light properties 304 may display new model data 130 reflecting the location of the distant light source relative to the model.

Figure 5:
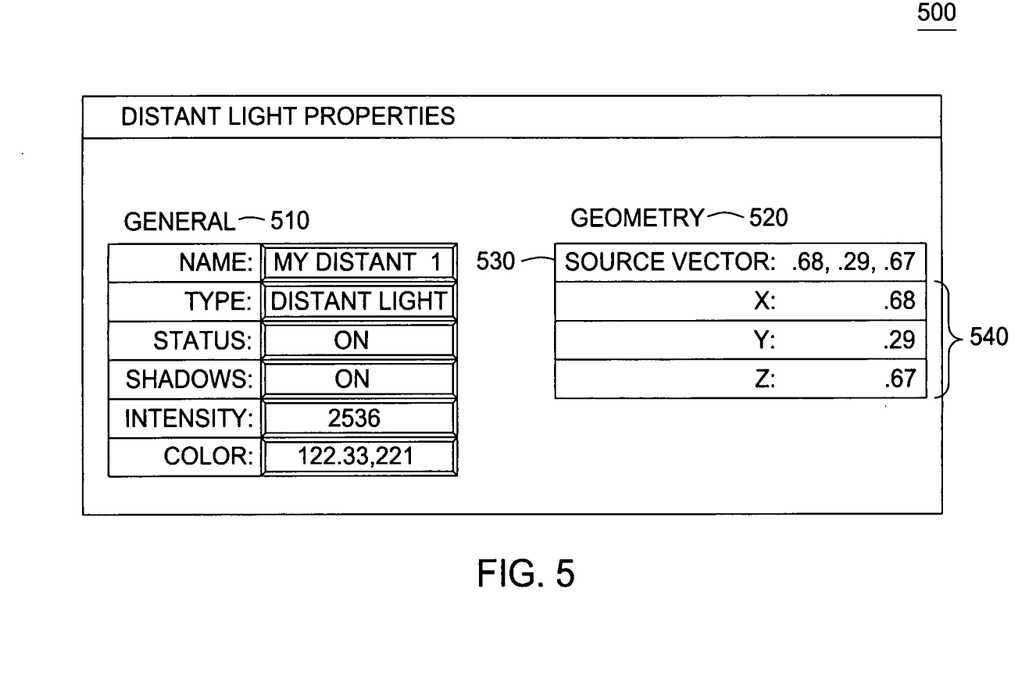
FIG. 5 illustrates a display of light source properties, according to one embodiment of the invention.

FIG. 5 illustrates a visual display 500 of properties for a distant light source, according to one embodiment of the invention. In this example, distant light source properties 510 specify general characteristics of the light source such as a name, a status, an indication of whether the light source casts shadows, as well as color and intensity information. In addition, the displayed properties include geometric properties 520 that specify, among other things, the position of the distant light source. As illustrated, geometric properties 520 are specified by source vector 530. The vector includes x, y, and z, elements 540 that describe the position of the distant light source.

Figure 6:
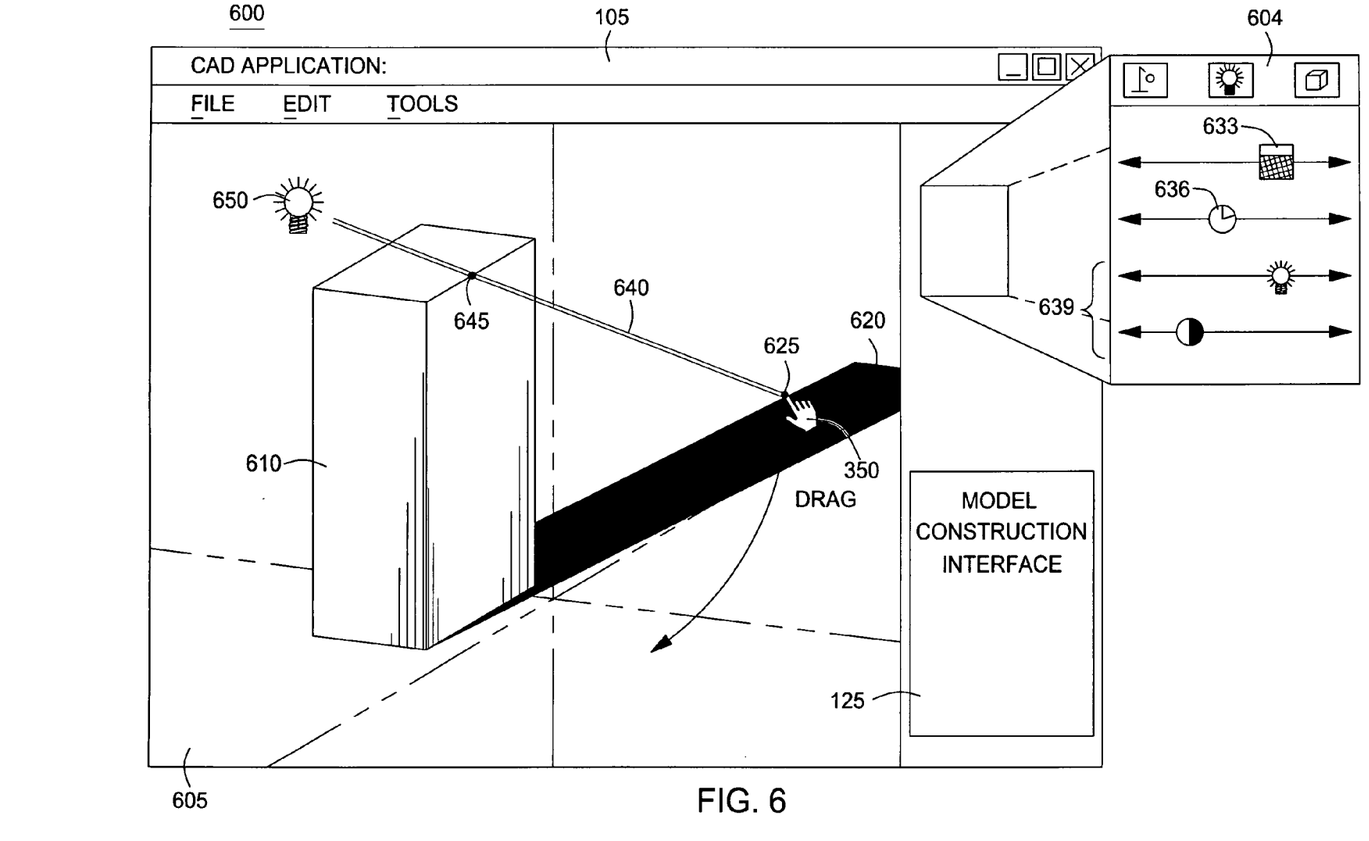
FIGS. 6-8 illustrate a visual display showing different positions of a shadow in a 3D model that is cast by a distant light source, representing the sun, according to one embodiment of the invention.
Figure 7:
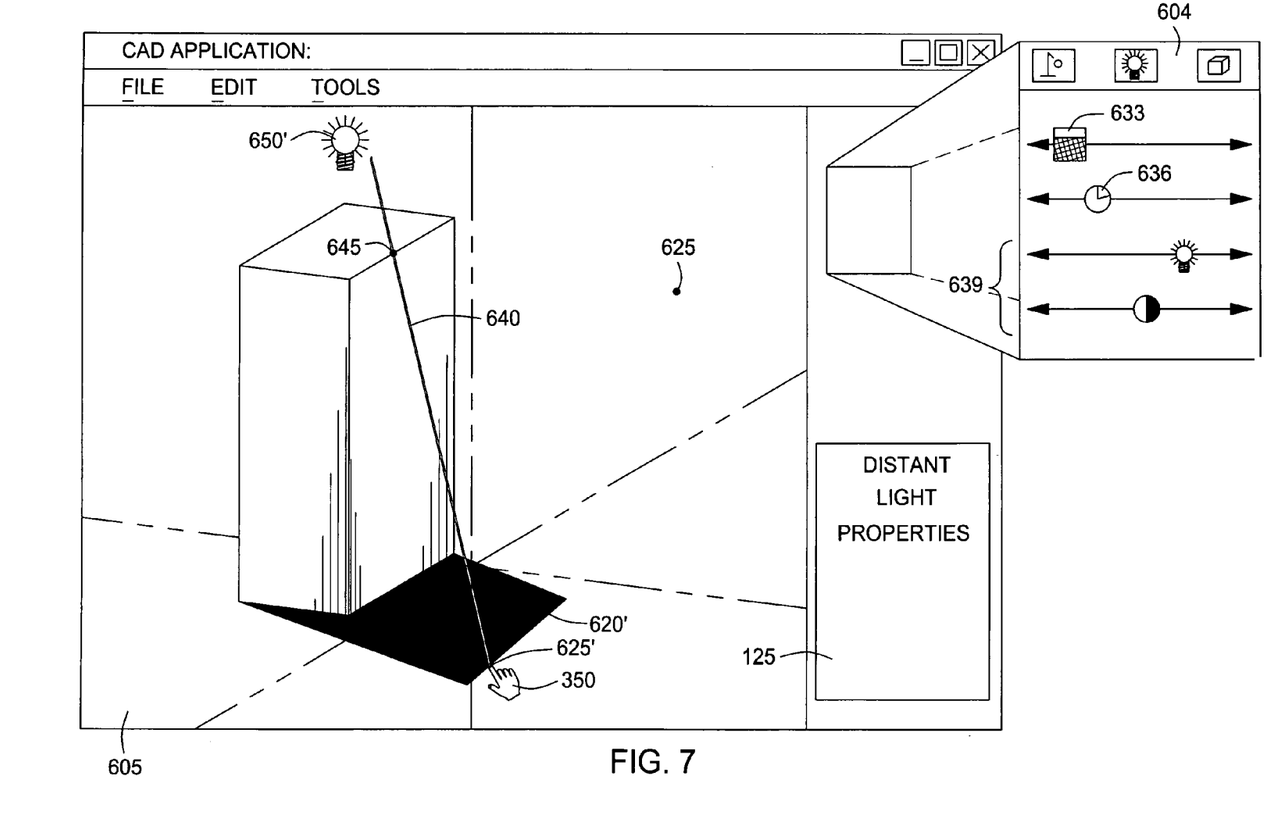
Figure 8:
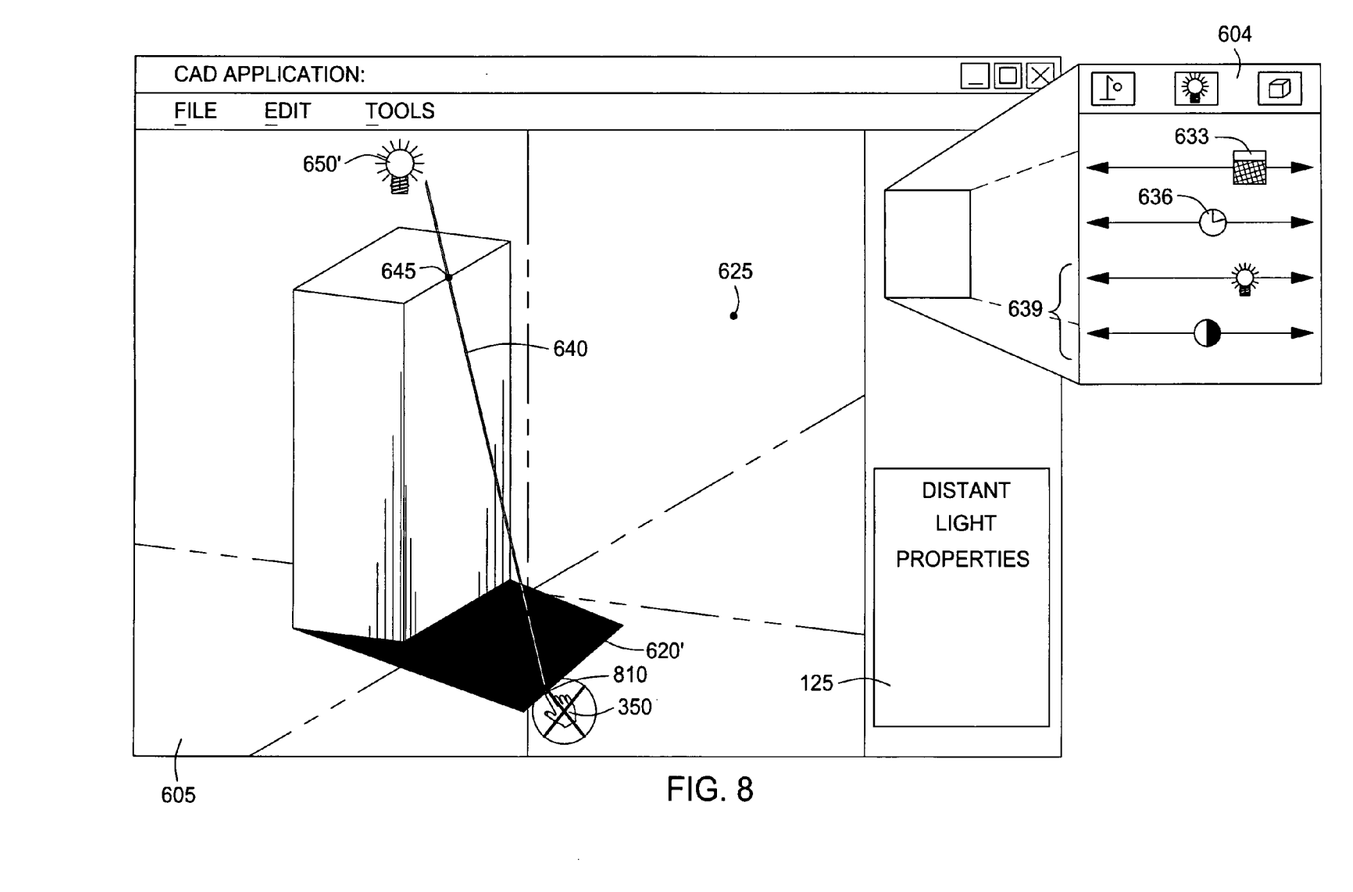

FIGS. 6-8 illustrate a visual display of a 3D model showing different positions of a shadow in a 3D model cast by a distant light source, representing the sun, according to one embodiment of the invention. First, FIG. 6 illustrates a view 600 of a CAD application 105. The view 600 includes display area 605 displaying a 3D model. The view 300 also includes a distant light source properties box 604 and model construction interface 125. As shown, shadow 620 is cast from object 610 by a distant light source 650, which represents light from the sun at a particular date 633 and time 636. Slider bars 630 illustrate the date 633 and time 636 that coincide with the position of shadow 620. Mouse cursor 350 is positioned at an initial location proximal to shadow grip-point 625. The shadow 620 extends from the object 610 along an area representing solid ground. In one embodiment, once the initial location 625 is selected, the CAD application 105 may be configured to display a ray line 640, which extends along a vector defined by the selected point 625 and the position of the light source 650. Additionally, pivot point 645 represents a point on the vector where a ray from the distant light source interests object 610. When a user moves the mouse cursor 350 to drag grip-point 625 from an initial position, the pivot point 645 remains stationary, and both are used to calculate the position of the distant light source 650. Also, the date 633 and time 636, may be updated to reflect the appropriate date and time for the position of the distant light source 650.

FIG. 7 illustrates a subsequent view 700 of the 3D model 605 illustrated in FIG. 6, after the shadow grip-point 625 has been dragged to destination location 625'. At the same time, ray line 640 has adjusted to indicate the new position of the distant light source 650. Further, the date 633 and time 636 have changed to coincide with the date and time at which the sun would cast the shadow 620' based on the new position of the light source 650' within the 3D model. Once the user releases the grip-point at destination 625', the ray line 640 may be removed from the display 605, and model data 130 may be updated based on the position of the distant light source 650'. In one embodiment, the user may drag the shadow grip-point 625 to a position such that the shadow 620' cannot actually occur. Depending on user preferences, the CAD application may be configured to respond to this situation in a variety of ways. For example, the interface may prohibit the user from dragging the grip-point 625 to a position that results in an impossible configuration, may display the boundary of a region within which the shadow grip-point may be dragged, or may provide visual feedback indicating that a desired position is not physically possible. The view 800 display in FIG. 8 illustrates this latter approach. Thus, view 800 shows the mouse cursor 350 with a slash running through a circle 810, to indicate an invalid position.

Figure 9:
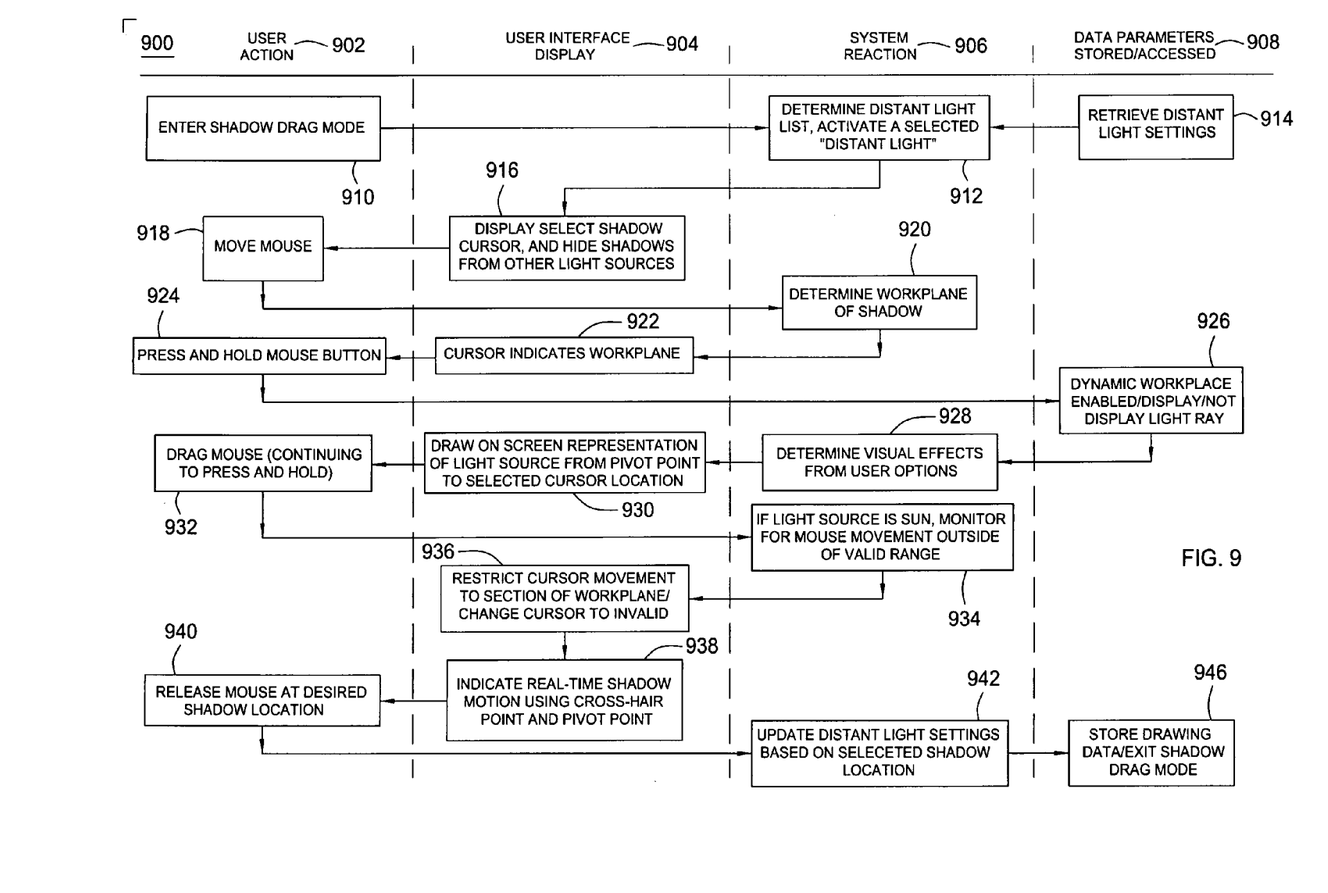
FIG. 9 illustrates a method for manipulating a shadow cast by an object in a 3D model, according to one embodiment of the invention.

FIG. 9 illustrates a method for dragging a shadow cast by an object in a 3D model from an initial position to a desired position using a shadow grip-point, according to one embodiment of the invention. The method 900 includes actions performed by a user (column 902), system responses (column 906), changes in the user interface display (column 904), and data that may be accessed, stored, or updated (column 908). In one embodiment, the method begins at step 910, where the user enables a shadow drag mode. As described above, the model construction tools 125 may include a toggle button used to enable the shadow drag mode. Once enabled, mouse movements that occur within display area 605 may be interpreted as commands to select a shadow grip-point and to move a designated shadow to a desired position.

At step 912, the CAD application 105 may present the user with a list of distant light sources that exist for the current CAD model. For example, to achieve a desired visual appearance, a user may have created multiple distant light sources. If so, a user may select a particular distant light source to manipulate. At step 914, the settings associated with the selected light source are retrieved from model data 130 (e.g., general settings 510 and geometric settings 520). At step 916, the user interface 110 alters the appearance of the mouse cursor to provide a visual indication that shadow drag mode is active. For example, FIGS. 3, 4, and 6-8 illustrate the mouse cursor 350 using a "grabbing hand" icon. Additionally, the 3D model display 120 may be rendered so as to remove any shadow that does not result from the distant light source selected at step 912.

At step 918, the user moves the mouse cursor 350 within the display area defined for the 3D model. While doing so, at step 920, the CAD application 105 may be configured to determine the face or workplane over which the mouse cursor 350 is positioned. For example, as illustrated in FIGS. 3 and 4, the mouse cursor may move over a workplane defined by wall 310 to a workplane representing solid ground. While doing so, the CAD application 105 may be configured to display an indication of which workplane is currently enabled. For example, at step 922, the user model display 120 may update the appearance of the mouse cursor 350 to indicate which workplane the mouse is currently hovering over. Alternatively, the boundaries of a current workplane may be highlighted.

At step 924, the user grabs a particular shadow by selecting a shadow grip-point. In one embodiment, any point within a bounded region defining a given shadow may be "gripped" by the user. The user may indicate the selection of a shadow grip-point by pressing and holding down a mouse button. At step 926, once selected the, CAD application 105 may be configured to retrieve or display shadow dragging settings specified by the user. User-configured specified by a user may include, e.g., whether dynamic workplane switching is available or enabled, or whether to display a representation of a light ray from the selected grip-point to the pivot point and beyond.

From these options, the CAD application generates the appropriate visual effects to display at step 928. At step 930, the user interface may display a ray line that traces from the shadow grip-point through the pivot point. The ray line indicates the position of the distant light source (e.g., ray line 640). At step 932, the user drags the shadow grip-point within the 3D model to a desired location by moving the mouse cursor 350. While the mouse cursor 350 is being dragged, the CAD application 105 may perform the steps illustrated in boxes 930-938. As previously described, in response to the changing position of the shadow grip-point, CAD application 105 modifies the position of the distant light source based on the location of the mouse cursor 350 relative to the pivot point and updates the appearance of the shadows in the 3D model. In addition, at step 934, if the distant light source represents light from the sun, then the CAD application 105 may also validate the desired location of the shadow grip-point to determine whether the user has moved the shadow grip-point to a location outside of a valid range.

At step 936, the CAD application may translate movement of the mouse cursor to a workplane associated with the initial grip-point location. Alternatively, if the CAD application 105 provides dynamic workplane switching, then the workplane (and thus, the plane used to translate of movements of the mouse-cursor 350) may be changed as the shadow grip-point is dragged within the 3D model. At step 938, the CAD application 105 may update the appearance of the mouse cursor. For example, the appearance of the mouse cursor 350 may change to indicate that the shadow may be dragged. (e.g., by "closing" the gripping hand icon illustrated for mouse cursor 350). Once the user has moved the shadow grip-point to a desired position, the user releases the mouse button at step 940. In response, the CAD application 105 updates the distant light properties to reflect the final position of the shadow grip-point in the 3D model. At step 942, these settings may be stored in 3D model data 130. After adjusting the appearance of shadows in the 3D model, the user may disable shadow drag mode at step 944.

CONCLUSION

Embodiments of the invention provide a method for manipulating the position and appearance of shadows cast by objects within a 3D model. Typically, the location and appearance of shadows are based on the position of a distant light source, such as the sun. Because the distant light source is not actually an object within the 3D model, the light source is usually manipulated by modifying geometric parameters defining its position. Thus, current CAD applications require a user to modify the position of the distant light source in order to modify the location and position of a shadow. Embodiments of the invention overcome this limitation by providing a CAD application that allows users to modify the position of a shadow directly.

Rather than repeatedly changing the position of a light source, users interact with a shadow cast by objects in a 3D model. Thus, users may achieve a desired effect—shadows with a certain appearance—in an easy to use manner. A user simply selects a point on a shadow (i.e., a shadow grip-point) and drags it from an initial location to a desired destination location, directly modifying the shadow. As the position of the shadow grip-point changes, a new position of the distant light source may be calculated using the position of the pivot point and the shadow-grip point.

Additionally, while embodiments described herein are used to modify the position of a distant light source, additional embodiments of the invention may be used to modify the appearance of a shadow cast by a light-casting object (e.g., a spotlight) present within the 3D model. The position and appearance of such a shadow may be manipulated by selecting and dragging a shadow grip-point, using the techniques described above. In such a case, the pivot point may be defined using the midpoint between the light-casting object and the shadow grip point. Further, once the shadow has been dragged to a desired location, the position of the object in the 3D model may be updated, accordingly.

While the foregoing is directed to embodiments of the present invention, other embodiments of the invention may be devised without departing from the basic scope thereof, and the scope thereof is determined by the claims that follow.

What is claimed is:

1. A computer-implemented method for manipulating a shadow of an object in a three-dimension (3D) model cast by a light source, the method comprising:
receiving, via an input device, an indication of an initial position of a shadow grip-point, wherein the initial position is defined within a shadow-bounded region of the 3D model;
determining a pivot point that is a point on a line between a current position of the light source and the initial position of the shadow grip-point:
receiving, via the input device, an indication of a destination position of the shadow grip-point, wherein the destination position is derived from movements of a mouse cursor that are translated into movements within a two-dimensional workplane based on the location of the two-dimensional workplane;
calculating a vector that represents a new position of the light source based on a position of the pivot point and the destination position of the shadow grip-point;
determining whether the new position of the light source is physically possible;
if the new position of the light source is not physically possible, then:
providing visual feedback indicating that the new position of the light source is not physically possible, or
if the new position of the light source is physically possible, then:
adjusting a plurality of properties associated with the light source based on the new position represented by the vector, wherein a first property of the plurality of properties comprises a position property that indicates a current position of the light source and a second property of the plurality of properties comprises a time of day property that indicates a time of day associated with the current position of the light source; and
modifying the shadow-bounded region based on the adjusted position of the light source.

2. The method of claim 1, wherein light from the light source represents sunlight within the 3D model.

3. The method of claim 2, wherein a user composing the 3D model is presented with an indication of whether the light source is capable of casting a shadow at the destination position of the shadow grip-point.

4. The method of claim 1, wherein the vector specifies a direction at which light rays emanating from the light source strike the object.

5. The method of claim 1, wherein the workplane associated with movements of the mouse cursor changes from a first workplane to a second workplane.

6. The method of claim 1, further comprising the step of displaying a ray extending from the shadow grip-point through the pivot point, after receiving the indication of the initial position of the shadow grip-point.

7. A non-transitory computer-readable medium containing instructions that when executed enables a processor to manipulate a shadow of an object in a three-dimension (3D) model cast by a light source by performing, the steps of:
receiving an indication of an initial position of a shadow grip-point, wherein the initial position is defined within a shadow-bounded region of the 3D model;
determining a pivot point that is a point on a line between a current position of the light source and the initial position of the shadow grip-point;
receiving, via the input device, an indication of a destination position of the shadow grip-point, wherein the destination position is derived from movements of a mouse cursor that are translated into movements within a two-dimensional workplane based on the location of the two-dimensional workplane;
receiving an indication of a destination position of the shadow grip-point;
calculating a vector that represents a new position of the light source based on a position of the pivot point and the destination position of the shadow grip-point;
determining whether the new position of the light source is physically possible;
if the new position of the light source is not physically possible, then:
providing visual feedback indicating that the new position of the light source is not physically possible, or
if the new position of the light source is physically possible, then:
adjusting a plurality of properties associated with the light source based on the new position represented by the vector, wherein a first property of the plurality of properties comprises a position property that indicates a current position of the light source and a second property of the plurality of properties comprises a time of day property that indicates a time of day associated with the current position of the light source; and
modifying the shadow-bounded region based on the adjusted position of the light source.

8. The computer-readable medium of claim 7, wherein light from the light source represents sunlight within the 3D model.

9. The computer-readable medium of claim 8, wherein a user composing the 3D model is presented with an indication of whether the light source is capable of casting a shadow at the destination position of the shadow grip-point.

10. The computer-readable medium of claim 7, wherein the vector specifies a direction at which light rays emanating from the light source strike the object.

11. The computer-readable medium of claim 7, wherein the workplane associated with movements of the mouse cursor changes from a first workplane to a second workplane.

12. The computer-readable medium of claim 7, wherein the steps performed further comprise, displaying a ray extending from the shadow grip-point through the pivot point, after receiving the indication of the initial position of the shadow grip-point.

13. A computing device comprising:
a processor; and
a memory configured to store an application that includes instructions which, enables a processor to manipulate a shadow of an object in a three-dimension (3D) model cast by a light source by performing, the steps of:
receiving an indication of an initial position of a shadow grip-point, wherein the initial position is defined within a shadow-bounded region of the 3D model;
determining a pivot point that is a point on a line between a current position of the light source and the initial position of the shadow grip-point;
receiving, via the input device, an indication of a destination position of the shadow grip-point, wherein the destination position is derived from movements of a mouse cursor that are translated into movements within a two-dimensional workplane based on the location of the two-dimensional workplane;

receiving an indication of a destination position of the shadow grip-point;

calculating a vector that represents a new position of the light source based on a position of the pivot point and the destination position of the shadow grip-point;

determining whether the new position of the light source is physically possible;

if the new position of the light source is not physically possible, then:
  providing visual feedback indicating that the new position of the light source is not physically possible, or if the new position of the light source is physically possible, then:
  adjusting a plurality of properties associated with the light source based on the new position represented by the vector, wherein a first property of the plurality of properties comprises a position property that indicates a current position of the light source and a second property of the plurality of properties comprises a time of day property that indicates a time of day associated with the current position of the light source; and
  modifying the shadow-bounded region based on the adjusted position of the light source.

14. The computing device of claim 13, wherein light from the light source represents sunlight within the 3D model.

15. The computing device of claim 14, wherein a user composing the 3D model is presented with an indication of whether the light source is capable of casting a shadow at the destination position of the shadow grip-point.

16. The computing device of claim 13, wherein the vector specifies a direction at which light rays emanating from the light source strike the object.

17. The computing device of claim 13, wherein the workplane associated with movements of the mouse cursor changes from a first workplane to a second workplane.

18. The computing device of claim 13, wherein the steps performed further comprise, displaying a ray extending from the shadow grip-point through the pivot point, after receiving the indication of the initial position of the shadow grip-point.

19. The method of claim 1, wherein the two-dimensional workplane is perpendicular to a ground, and wherein the movements of the mouse cursor are translated into up-and-down and left-to-right movements.

20. The computer-readable medium of claim 7, wherein the two-dimensional workplane is perpendicular to a ground, and wherein the movements of the mouse cursor are translated into up-and-down and left-to-right movements.

21. The computing device of claim 13, wherein the two-dimensional workplane is perpendicular to a ground, and wherein the movements of the mouse cursor are translated into up-and-down and left-to-right movements.

22. The method of claim 1, wherein the movement of the shadow grip-point is restricted to remain within the two-dimensional workplane.

23. The computer-readable medium of claim 7, wherein the movement of the shadow grip-point is restricted to remain within the two-dimensional workplane.

24. The computing device of claim 13, wherein the movement of the shadow grip-point is restricted to remain within the two-dimensional workplane.

* * * * *